April 10, 1928. 1,665,880

J. E. HALE

VEHICLE WHEEL

Filed Sept. 24, 1921 3 Sheets-Sheet 1

Inventor
James E. Hale

April 10, 1928.
J. E. HALE
1,665,880
VEHICLE WHEEL
Filed Sept. 24, 1921
3 Sheets-Sheet 2
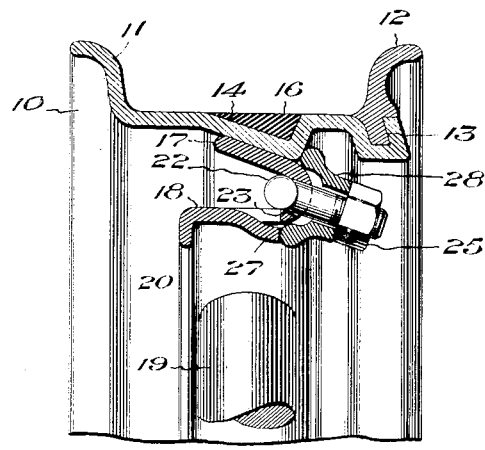
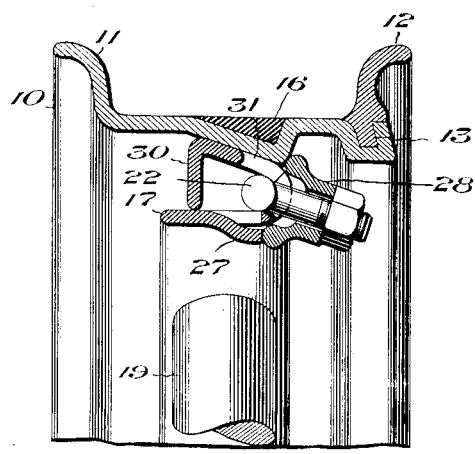
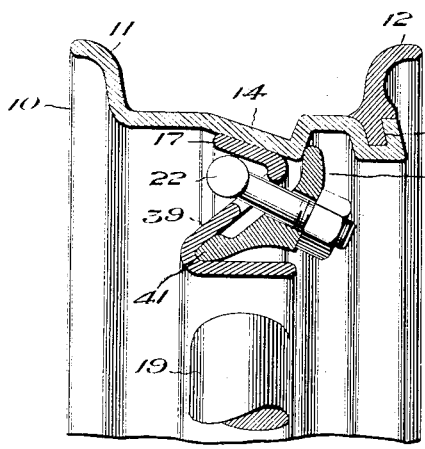
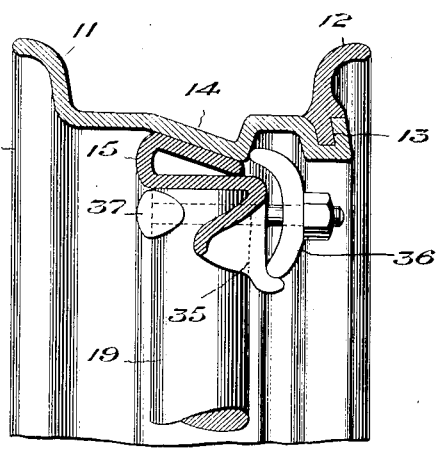
Inventor
James E. Hale
By R. D. Teagarden
Attorney Patented Apr. 10, 1928.

1,665,880

UNITED STATES PATENT OFFICE.

JAMES E. HALE, OF AKRON, OHIO, ASSIGNOR TO THE GOODYEAR TIRE & RUBBER COMPANY, OF AKRON, OHIO, A CORPORATION OF OHIO.

VEHICLE WHEEL.

Application filed September 24, 1921. Serial No. 502,938.

My invention relates to vehicle wheels and particularly to vehicle wheels equipped with demountable rims for pneumatic tires.

The objects and advantages to be derived from practicing my invention will be apparent from a perusal of the description in conjunction with the drawings in which:

Figs. 3 to 10, inclusive, are corresponding lateral sectional views of modified forms of vehicle wheels constructed in accordance with my invention.

Figure 1:
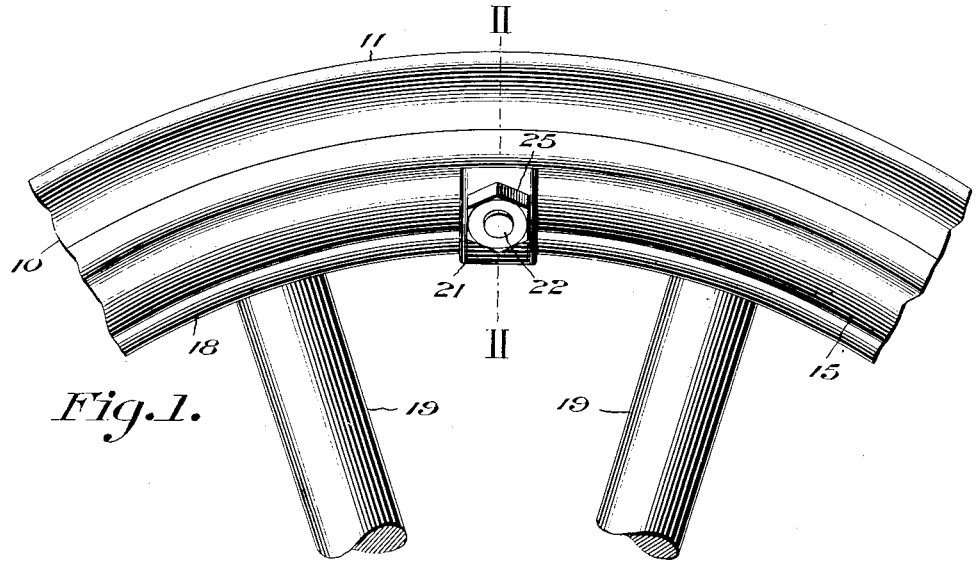
Fig. 1 is a side elevational view of a portion of a vehicle wheel embodying my invention.
Figure 2:
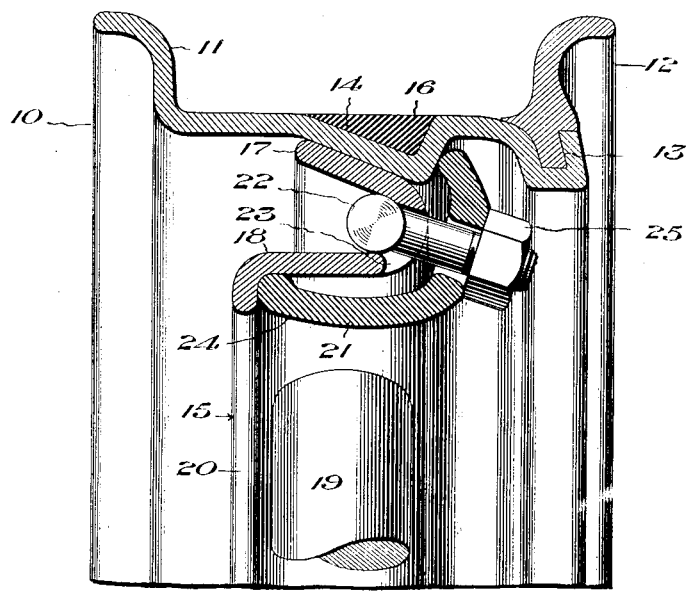
Fig. 2 is a lateral sectional view taken substantially on lines II—II of Fig. 1.

Referring particularly to Figs. 1 and 2 of the drawings, the numeral 10 indicates a demountable tire rim which embodies an integral tire retaining flange 11, and a removable side ring 12. A gutter 13, formed in the base portion of the tire rim, is adapted to receive the side ring 12. A substantially centrally located depressed portion 14 is adapted to seat on a felly band 15. A filler strip 16, of any suitable material, fits within the depression 14 to form a seat for the pneumatic tire.

The felly 15, shown in the above noted figures, comprises an outer tire rim supporting portion 17, that is preferably of frusto-conical form, and an inner spoke seating portion 18 that is adapted to receive and secure the tenoned ends of a plurality of spokes 19. The spoke seating portion of the felly 15 has an inwardly turned radial flange 20 that constitutes means for stiffening the felly 15 and, in conjunction with the depression 14, provides a seat for a plurality of tire rim clamping devices 21.

Each of the clamping devices 21 embodies a T-head bolt 22 that extends through an opening 23 provided in the wall of the felly, and a clamping member 24 that engages the radial flange 20 of the felly and the wall of the tire rim depression 14 to draw the tire rim into secure engagement with the seating surface 17 of the felly when each of the nuts 25 of the bolts is tightened.

The opening 23 for the bolt 22 is so constructed that it provides considerable latitude of movement for the bolt in order that the bolt may adjust itself to the position assumed by the clamping member 24.

Obviously, a predetermined size and design of felly, made in accordance with my invention, is adapted to receive any width of demountable tire rim. The line of support for such a tire rim extends substantially through the median plane of the wheel and, therefore, provides a suitable support for tire rims of any width without subjecting the wheel to undue strains. In vehicle tire rims where the point of support of the tire rim is removed from the central plane of the wheel, a considerable twisting moment is developed in the wheel by reason of the distance between the plane of action of the load and the plane of the vehicle wheel. It is therefore evident that a commercial car, for instance, could be equipped with fellies of uniform size and yet be adapted to receive vehicle tire rims of any suitable width on the front and rear wheels. This is a distinct departure from the conventional practice of requiring a definite width of felly for each of two or three groups of tire rim widths.

A desirable and novel method of manufacturing a vehicle wheel of this general type is to stamp half-sections of the tire rim 10 from sheet metal and to weld these sections together to form the completed tire rim. The tire rim may then be placed in a flanging machine, or otherwise suitably treated, to properly shape the gutter 13.

The filler band 16 may be formed from any suitable material. In the present instance, a light weight flexible endless band of rubber composition is employed. Very little resiliency is required since the actual elongation of the band, to permit its insertion and removal from the depression 14, is proportionately small.

The felly 15 is stamped from a single disc of metal by either one or two operations. When the disc of metal is initially punched to size, the openings 23 for the clamping bolts and for receiving the ends of the spokes may be punched from the disc since no great degree of accuracy of dimension is required for these openings. The spoke openings may later be reamed if necessary. The disc may then be pressed laterally of the plane of the disc to form the felly by a single operation of the metal press. No further description of these conventional operations is deemed necessary for a complete understanding of the novel method of manufacturing the tire rim and felly.

The assembly of the wheel may be effected in any conventional manner suitable to this general construction.

The expense of manufacturing a vehicle wheel in accordance with my invention is thus greatly reduced. The fact that the felly does not require the usual sizing operations augments this saving in the expense of manufacture.

The felly illustrated in lateral section in Fig. 3 is a modified form of my invention in which a lug 27 is sheared from the spoke receiving portion of the tire rim in such manner and in such location as to provide an abutment against which a clamping member 28 may seat.

The clamping member 28 has particular advantages, however, since both legs of the clamp are identical, which permits the clamp to be assembled with either leg in engagement with the tire rim. This prevents the wrong assembly of the clamp and provides a clamp of inexpensive manufacture.

The remainder of this tire rim is identical with that shown and described in conjunction with Figs. 1 and 2. Corresponding portions of the various wheel structures are similarly numbered throughout the several figures of the drawings.

The felly shown in Fig. 4 embodies an inwardly turned radial flange 30 that extends from the tire rim seating portion of the felly to engagement with the spoke receiving portion of the band. This form of tire rim is similar in other details to the rim shown in Fig. 3. In this modification of my invention, the head of the bolt 22 may be dropped through an opening 31 in the tire rim supporting surface of the felly.

Figure 5:
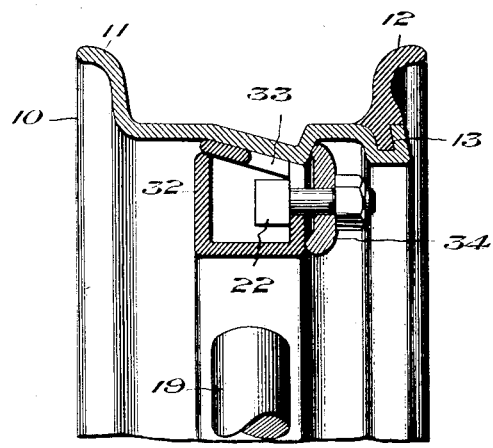

Fig. 5 shows a felly in which the radial supporting flange 32 extends upwardly from the spoke seating portion. The T-head bolt 22 may be introduced through an opening 33 in the tire rim seating portion of the felly in the manner described in conjunction with Fig. 4. A conventional form of clamping device 34 is employed with this form of felly.

Another modification of my invention is shown in Fig. 6 in which the tire rim seating portion is folded outwardly over the spoke retaining portion of the felly which is provided with a radial flange that is formed into sockets 35 for receiving the heads of the spokes 19. A tire rim clamping mechanism 36 of conventional form is employed in conjunction with this felly. The head of the bolt 37, in this instance, embraces the spoke in the manner shown.

Fig. 7 shows a further modification of my invention in which a felly of Z section is employed in lieu of the V shaped sections shown in the preceding figures. In this instance, the connecting web 39 extends diagonally between the tire rim supporting portion and the spoke-receiving portion of the felly. This web provides means for securing and seating the clamp 40. The lower end 41 of the clamping member 40 seats in the pocket formed between the connecting web 39 and the spoke receiving portion of the felly. Obviously, any desirable form of spoke receiving band may be employed in this instance.

Figure 8:
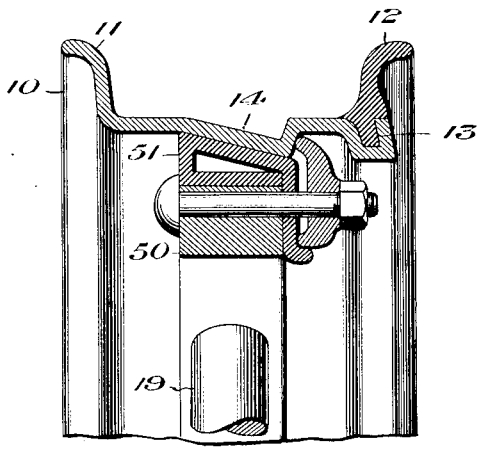

Fig. 8 differs from the other forms of my invention in that it embodies a wooden felly 50 that supplements the metal felly band 51.

Figure 9:
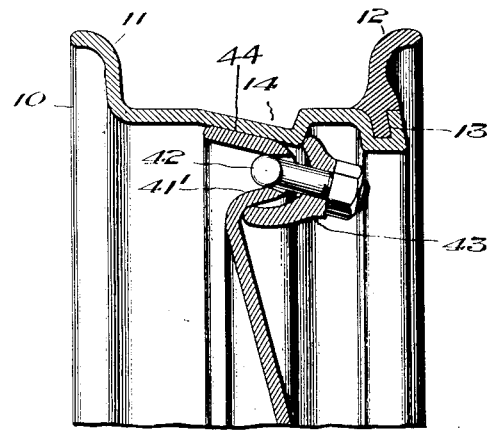
Figure 10:
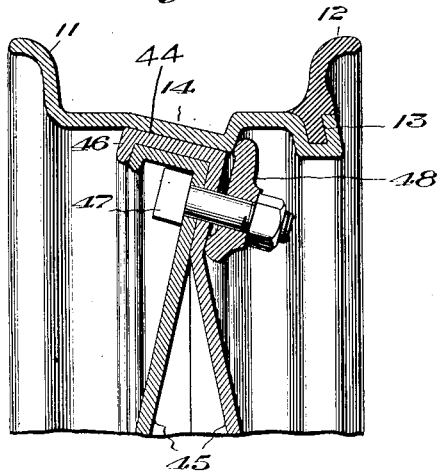

Figs. 9 and 10 illustrate my invention as applied to wheels of the conventional disk type. The wheel shown in Fig. 9 embodies a corrugation 41' that extends around the periphery of the disc and constitutes a socket for receiving the bolts 42 of the rim-clamping devices 43 and forms an off-set for the rim supporting surface 44. The lower end of the clamping bracket engages the inner shoulder of the corrugation to provide a seat for the clamping member.

The wheel shown in Fig. 10 embodies a double disk 45. The tire rim seating portion 46 of the disk constitutes a receiving socket for the clamping bolts 47. A conventional clamp 48 is employed.

The specific structural details and relationship of parts herein shown and described may obviously be changed without departing from the spirit and scope of my invention. It is my intention to claim all novelty inherent in my invention as broadly as the prior art may permit. I desire, therefore, that only such limitations shall be imposed as are indicated in the appended claims.

What I claim is:

1. The combination of a felly having a rim seating portion overhanging a spoke-receiving portion, a demountable tire rim, and clamping devices for securing the tire rim to the felly pivotally mounted intermediate the rim-seating and spoke-receiving portions and adapted to swing in a radial plane when loosened.

2. The combination with a felly having a rim-seating portion in radial alignment with a spoke-receiving portion, of a demountable tire rim, and clamping means for securing the tire rim to the felly comprising a clamp member and a T-headed bolt operating therewith, said bolt being swingably mounted intermediate the rim-seating and spoke-receiving portions of the felly.

In witness whereof I have hereunto signed my name.

JAMES E. HALE.